United States Patent Office 3,027,396
Patented Mar. 27, 1962

3,027,396
ORGANOALKOXYBORANES
George W. Willcockson, Anaheim, Calif., assignor to United States Borax & Chemical Corporation, Los Angeles, Calif., a corporation of Nevada
No Drawing. Filed Oct. 21, 1960, Ser. No. 63,970
8 Claims. (Cl. 260—462)

The present invention relates to an improved method for producing organoalkoxyboranes.

It is the principal object of the present invention to provide an improved method for the direct preparation of the alkyl- and aryldialkoxyboranes and the dialkyl- and diaryl-alkoxyboranes.

Other objects will appear as the description proceeds.

To the accomplishment of the foregoing and related ends, said invention then comprises the features hereinafter fully described and particularly pointed out in the claims, the following description setting fourth in detail certain illustrative embodiments of the invention, these being indicative, however, of but a few of the various ways in which the principle of the invention may be employed.

Broadly stated, the present invention comprises the direct method for preparing organoalkoxyboranes having the formula $$R_xB(OR')_{3-x}$$

which comprises reacting a compound having the formula RM with a trialkyl borate ester and then reacting the resultant mass with boron trichloride, where R is a material selected from the group consisting of alkyl radicals, phenyl substituted alkyl radical, phenyl and phenyl substituted with alkyl radicals, M is a material selected from the group consisting of Na, Li, K, MgCl and MgBr, R' is an alkyl radical and $x$ is an integer from 1 to 2.

The reactions of the foregoing broadly stated paragraph can be illustrated by the following equations:

$$xRM + B(OR')_3 \rightarrow R_xB(OR')_{4-x}M + (x-1)MOR'$$

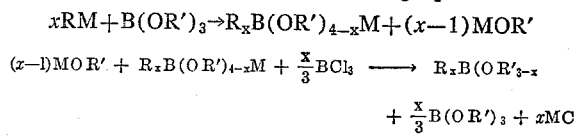

where R, R', M and $x$ are as defined above.

Thus, the present invention provides a general extremely facile method for the direct preparation of organoalkoxyboranes having the general structures $RB(OR')_2$ and $R_2B(OR')$ as defined above. The present method offers several advantages, e.g., (1) the starting materials are readily available or are easily prepared by standard well-known techniques, (2) the need for additional troublesome operations, such as treatment of organohaloboranes ($RBCl_2$ or $R_2BCl$) or an organohydroxyborane $[RB(OH)_2$ or $R_2B(OH)]$ with an alcohol is eliminated, (3) the products are easily isolated in the pure state by distillation, (4) all (R'O) groups are recovered as product or as reusable trialkyl borates, and (5) alcohols are neither a reactant nor a product so that the production of undesirable alcohol-product azeotropes is not possible.

The products of the present invention have utility as fuel additives and fungicides.

Referring now to the trialkyl borate esters used in the present invention, these esters can be derived from any unsubstituted saturated monohydroxy aliphatic alcohol, the number of carbon atoms in the alkyl radical being immaterial to the present invention. However, in the preferred embodiment of my invention I use trialkyl borate esters having alkyl radicals containing from 1 to 4 carbon atoms. The use of the preferred esters is dictated by economy and availability, and again it is emphasized that the size of the alkyl group is immaterial to the present invention. Thus, trimethylborate or trioctylborate or esters having even larger alkyl groups can be used in the present invention.

The compounds having the general formula RM where R is an alkyl radical, phenyl substituted alkyl radical, phenyl radical or substituted phenyl radical containing alkyl substituents and M is Na, Li, K, MgCl or MgBr are well known to the art. Compounds such as these can be prepared by reacting Na, Li, K or Mg with an alkyl chloride, alkyl bromide, aryl chloride or aryl bromide. Again, as with the previously defined trialkyl borate esters, the size of the alkyl group is immaterial to the present process; thus, alkylmagnesium halides, aryl-alkali metals, alkaryl-alkali metals, aralkyl-alkali metals, aralkyl-magnesium halides, alkyl- alkali metals, etc., having from 1 to 12 or even more carbon atoms can be prepared.

So that the present invention can be more easily understood, the following examples are given for illustrative purposes:

(I)

A solution of ethylmagnesium bromide in one liter of ether was prepared from 72 grams (3 moles) of magnesium turnings and 220 mls. (3 moles) of ethyl bromide. The ethylmagnesium bromide was added to freshly distilled tri-n-butyl borate at −40° C. to −60° C. and the mixture was then allowed to warm to room temperature with constant agitation.

The reaction mass was cooled to −50° C. and 117 grams (1 mole) of boron trichloride was added via sub-surface gas inlet tube. The resultant mixture was stirred as it warmed to room temperature and then was filtered. The filter cake was washed with ether and the filtrate was distilled through an 18-inch vacuum jacketed distillation column packed with glass beads to yield dibutoxyethylborane, butoxydiethylborane and tri-n-butyl borate. Chemcal analysis of these compounds yielded the following data:

|  | Calculated, percent | Found percent |
|---|---|---|
| 1. B in dibutoxyethylborane | 5.82 | 5.76 |
| 2. B in butoxydiethylborane | 7.63 | 7.67 |
| 3. B in tri-n-butyl borate | 4.71 | 4.70 |

(II)

Ethylsodium was prepared from 51 grams of dispersed sodium and 64.5 grams of ethyl chloride in a mineral oil-heptane solvent. The ethylsodium was added to trimethyl borate (1 mole) at −40° C. to −60° C. and the mixture was then allowed to warm to room temperature with constant agitation.

The reaction mass was cooled to about −50° C. and 39 grams (0.33 mole) of boron trichloride was added via a sub-surface gas inlet tube. The resultant mixture was stirred as it warmed to room temperature and was then filtered. The filtrate was distilled through an 18-inch vacuum jacketed distillation column packed with glass beads to yield dimethoxyethylborane, methoxydiethylborane and trimethyl borate. Chemical analysis of these compounds yielded the following data:

|  | Calculated, percent | Found percent |
|---|---|---|
| 1. B in dimethoxyethylborane | 10.72 | 10.64 |
| 2. B in methoxydiethylborane | 10.84 | 10.78 |
| 3. B in trimethyl borate | 10.42 | 10.40 |

(III)

Phenylsodium was prepared from 138 grams (6 moles) of sodium and 337 grams (3 moles) of chlorobenzene dispersed in three liters of toluene. The phenylsodium was added to triethyl borate (3 moles) at −40° C. to −60° C. and the mixture was then allowed to warm to room temperature with constant agitation. The reaction mass was cooled to about −50° C. and 117 grams (1 mole) of boron trichloride was added via a subsurface gas inlet tube. The resultant mixture was stirred as it warmed to room temperature and was then filtered. The filtrate was distilled through an 18-inch vacuum jacketed distillation column packed with glass beads to yield diethoxyphenylborane, ethoxydiphenylborane and triethyl borate. Chemical analysis yielded the following data for these compounds:

|  | Calculated, percent | Found percent |
| --- | --- | --- |
| 1. B in diethoxyphenylborane | 6.09 | 6.01 |
| 2. B in ethoxydiphenylborane | 5.16 | 5.22 |
| 3. B in triethyl borate | 7.42 | 7.40 |

Other modes of applying the principle of the invention may be employed provided the features stated in any of the following claims or the equivalent of such be employed.

I, therefore, particularly point out and distinctly claim as my invention:

1. The direct method for preparing organoalkoxyboranes having the formula $$R_xB(OR')_{3-x}$$

which comprises reacting a compound having the formula RM with a trialkyl borate ester and then reacting the resultant reaction mass with boron trichloride, where R is a material selected from the group consisting of alkyl radicals, phenyl substituted alkyl radical, phenyl and phenyl radicals substituted with alkyl substituents, M is a material selected from the group consisting of Na, Li, K, MgCl and MgBr, R' is an alkyl radical and $x$ is an integer from 1 to 2.

2. The direct method for preparing organoalkoxyboranes having the formula $$R_xB(OR')_{3-x}$$

which comprises reacting a compound having the formula RM with a trialkyl borate ester and then reacting the resultant reaction mass with boron trichloride, where R is a material selected from the group consisting of alkyl radicals, phenyl substituted alkyl radical, phenyl and phenyl radicals substituted with alkyl substituents, M is a material selected from the group consisting of Na, Li, K, MgCl and MgBr, R' is an alkyl radical having from 1 to 4 carbon atoms and $x$ is an integer from 1 to 2.

3. The direct method for preparing organoalkoxyboranes having the formula $$R_xB(OR')_{3-x}$$

which comprises reacting a compound having the formula RMgCl with a trialkyl borate ester and then reacting the resultant reaction mass with boron trichloride, where R is a material selected from the group consisting of alkyl radicals, phenyl substituted alkyl radical, phenyl and phenyl radicals substituted with alkyl substituents, R' is an alkyl radical having from 1 to 4 carbon atoms and $x$ is an integer from 1 to 2.

4. The direct method for preparing organoalkoxyboranes having the formula $$R_xB(OR')_{3-x}$$

which comprises reacting a compound having the formula RNa with a trialkyl borate ester and then reacting the resultant reaction mass with boron trichloride, where R is a material selected from the group consisting of alkyl radicals, phenyl substituted alkyl radical, phenyl and phenyl radicals substituted with alkyl substituents, R' is an alkyl radical having from 1 to 4 carbon atoms and $x$ is an integer from 1 to 2.

5. The direct method for preparing organoalkoxyboranes having the formula $$R_xB(OR')_{3-x}$$

which comprises reacting a compound having the formula RM with a trialkyl borate ester at a temperature of from about −40° C. to about −60° C., allowing the resultant reaction mass to warm to ambient temperature under constant agitation, cooling said reaction mass to about −50° C., adding boron trichloride, allowing the resultant reaction mass to warm to ambient temperature while stirring, and recovering the organoalkoxyboranes by distillation where R is a material selected from the group consisting of alkyl radicals, phenyl substituted alkyl radical, phenyl and phenyl radicals substituted with alkyl substituents, M is a material selected from the group consisting of Na, Li, K, MgCl and MgBr, R is an alkyl radical and $x$ is an integer from 1 to 2.

6. The method of preparing dibutoxyethylborane and butoxydiethylborane which comprises reacting ethylmagnesium bromide with tri-n-butyl borate at from about −40° C. to about −60° C., allowing the reaction mass to warm to ambient temperature under constant agitation, cooling the reaction mass to about −50° C., adding boron trichloride, allowing the reaction mass to warm to ambient temperature while stirring, and recovering substantially pure dibutoxyethylborane and butoxydiethylborane by distillation.

7. The method of preparing dimethoxyethylborane and methoxydiethylborane which comprises reacting ethylsodium with trimethyl borate at from about −40° C. to about −60° C., allowing the reaction mass to warm to ambient temperature under constant agitation, cooling the reaction mass to about −50° C., adding boron trichloride, allowing the reaction mass to warm to ambient temperature while stirring, and recovering substantially pure dimethoxyethylborane and methoxydiethylborane by distillation.

8. The method of preparing diethoxyphenylborane and ethoxydiphenylborane which comprises reacting phenylsodium with triethyl borate at from about −40° C. to about −60° C., allowing the reaction mass to warm to ambient temperature under constant agitation, cooling the reaction mass to about −50° C., adding boron trichloride, allowing the reaction mass to warm to ambient temperature while stirring, and recovering substantially pure diethoxyphenylborane and ethoxydiphenylborane by distillation.

References Cited in the file of this patent

UNITED STATES PATENTS 2,884,439    Edwards _____ Apr. 28, 1959

OTHER REFERENCES

Brindley et al.: J. Chem. Soc. (London), pp. 2956–8 (1955).